March 24, 1931.  A. E. McLEAN  1,797,690

DRILL BIT

Filed April 2, 1929

INVENTOR.
Anthony E. McLean
BY
R. W. Smith
ATTORNEY.

Patented Mar. 24, 1931

1,797,690

UNITED STATES PATENT OFFICE

ANTHONY E. McLEAN, OF FULLERTON, CALIFORNIA, ASSIGNOR OF ONE-THIRD TO CLARENCE M. GRAVETT, OF LONG BEACH, CALIFORNIA

DRILL BIT

Application filed April 2, 1929. Serial No. 351,851.

This invention is a drill bit adapted for wearing away of its cutting edge during the drilling operation, without so increasing the area of the contacting surface of the cutting edge as to arrest rotation of the bit through frictional resistance until substantially the entire cutting blade has been worn away.

It is an object of the invention to provide a bit having a secondary cutting edge spaced from its normal primary cutting edge, with said secondary cutting edge adapted for cutting engagement when the primary cutting edge has been worn away.

It is a further object of the invention to insure required strength and rigidity for the bit by providing a body for the bit which gradually divergently tapers in thickness from its cutting edge, but which is so constructed as to appreciably retard increase in the contacting area of the cutting edge of the tapering bit as the cutting edge is worn away.

Further objects of the invention will be readily understood from the following description of the accompanying drawings, in which.

Figure 3:
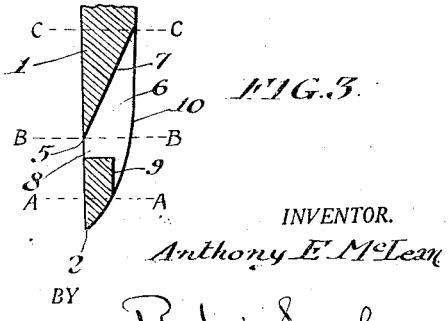
Fig. 3 is a longitudinal section on the line 3—3 of Fig. 1.

The improved construction may be incorporated in any type of drilling bit, and for the purpose of illustration is herein shown and described in connection with a usual fishtail bit having the oppositely facing blades 1. In longitudinal section the blades 1 preferably divergently taper in thickness from their end cutting edges 2 as shown in Fig. 3, in order to provide the required strength and rigidity for the blades, and the end cutting edges 2 may curve backwardly from the radially outer longitudinal cutting edges 3 of the blades with said longitudinal cutting edges preferably inclined rearwardly from the front faces of blades 1 as shown at 4. The cutting edges 2 as they are worn away thus present an ever increasing cross-sectional contacting surface as a result of the tapering construction of the body of the blades as shown in Fig. 3, the various stage of said increasing contact surfaces being indicated at the lines A—A, B—B, and C—C in Fig. 3; and with the ordinary bit construction this steadily increasing contacting surface results in corresponding increased frictional resistance which will stop or at least appreciably retard rotation of the bit when the cutting edges 2 have been worn away to about the line A—A.

The present invention insures required strength for the body of the blades while appreciably retarding increase in the area of the contacting surfaces of cutting edges 2 as they are worn away beyond the line A—A, so that said cutting edges may be worn away to the line B—B without their contacting surfaces so increasing in area as to stop or retard rotation of the bit through frictional resistance. The invention also provides reduction in the contacting surfaces of the cutting edges of the blades at the line B—B, so as to then operatively present secondary cutters having sharp cutting edges 5 which will still further reduce the area of the contacting surfaces of the blades in order that rotation of the bit may be readily continued without frictional resistance retarding or completely stopping the bit. This reduction in contacting area at the sharp cutting edges of the secondary cutters is made while maintaining the required strength of construction for the blades, and the secondary cutters preferably gradually divergently taper in thickness from their cutting edges 5 so as to insure the necessary rigidity for said secondary cutters, but with the contacting surfaces of the blades so reduced at the line B—B as to provide for wearing away of the secondary cutting edges 5 to a point between the lines B—B and C—C before the contacting area of the blades is so increased as to retard or stop rotation of the bit as a result of frictional resistance.

Figure 1:
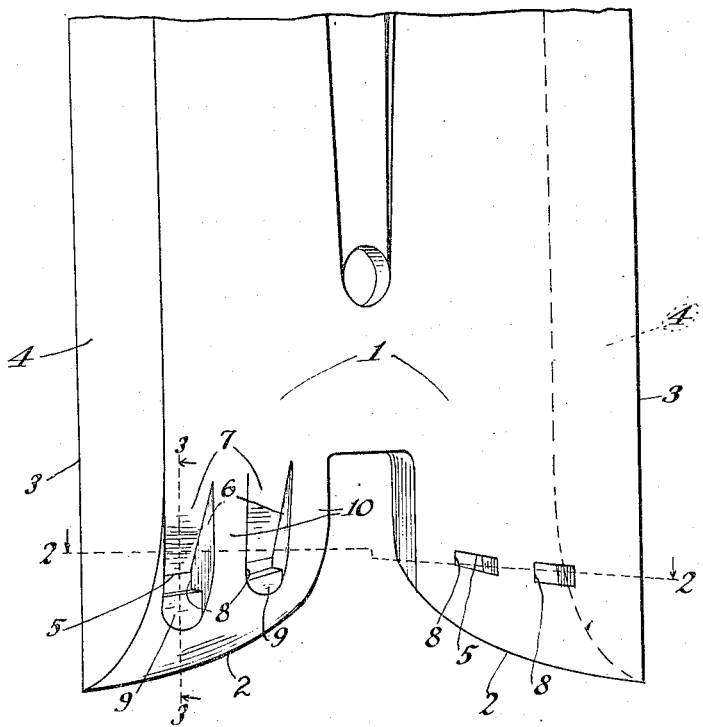
Fig. 1 is a fragmentary view of a bit constructed in accordance with the invention, looking angularly at a face of the bit.

As an instance of such construction each of the blades of the bit may be longitudinally recessed at its rear face as shown at 6, with a plurality of said longitudinal recesses preferably formed in the rear face of each of the blades and appreciably transversely spaced as shown in Fig. 1. At their upper ends the recesses 6 merge into the rear faces of the shanks of blades 1 at about the point where the taper in thickness of cutting edges 2 merges into the substantially uniform thickness of said shanks of the blades, which point is at approximately the line C—C; and the recesses 6 terminate at their opposite ends by merging into the taper of cutting edges 2 at approximately the line A—A. The bottoms 7 of the upper ends of recesses 6 gradually slope inwardly from their points of mergence with the rear faces of the shanks of the blades at the line C—C to the front faces of the blades at the line B—B below which the recesses 6 open through said front faces of the blades as shown at 8, so that the sloping bottoms 7 of the recesses form the secondary cutting edges 5 at the upper edges of openings 8, with said cutting edges 5 having an upwardly divergently tapering thickness between the front faces of the blades and the sloping bottoms 7 of the recesses as shown in Fig. 3.

The openings 8 are of relatively narrow width longitudinally of blades 1, and between the lower edges of said openings and the lower ends of recesses 6 the bottoms 9 of said lower portions of the recesses are preferably approximately parallel to the front faces of blades 1, and the lower ends of bottoms 9 merge into the rear faces of cutting edges 2 at approximately the line A—A at the lower edges of recesses 6, so that between the bottoms 9 of the recesses and the front faces of the blades the cutting edges 2 are of substantially uniform thickness from the line A—A to the openings 8 as shown in Fig. 3.

Figure 2:
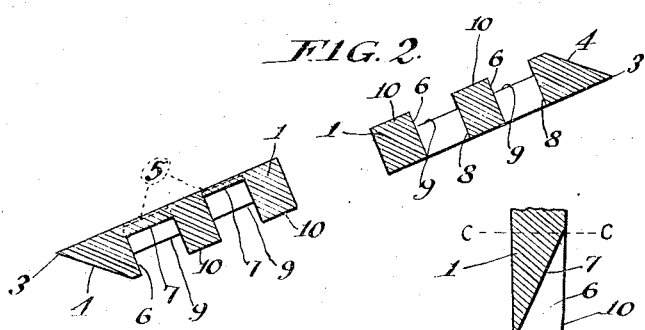
Fig. 2 is a transverse section on the line 2—2 of Fig. 1.

The portions of blades 1 between adjacent recesses 6 form ribs 10 extending longitudinally of the blades and insuring required strength and rigidity for the bit at both the primary cutting edges 2 and at the subsequently operative cutting edges 5; and as the blades of the bit are worn away the cross-sectional contacting surfaces of cutting edges 2 will thus attain their maximum area when the cutting edges have been worn away to the line A—A, with said contact surfaces of appreciably reduced area between the lines A—A and B—B as a result of recesses 6 extending into said contact surfaces as shown at the right of Fig. 2. The contact surfaces of the blades are then still further reduced in area by the sharp cutting edges 5 forming a part of said contact surfaces at the line B—B as shown in dotted lines at the left of Fig. 2, so that the subsequently increasing cross-sectional area of said contact surfaces as caused by the gradually increasing thickness of the secondary cutters which form cutting edges 5, will not reach a point where frictional resistance will arrest rotation of the bit until the cutter edges 5 are worn away to some point between the lines B—B and C—C.

I have thus provided a drill bit having required strength and rigidity as a result of its ribbed construction as shown at 10, with the cutting edges 2 of the blades adapted to be worn away in usual manner to the line A—A, up to which point the cross-sectional contacting surfaces of the cutting edges will not have increased in area to a point where frictional resistance will retard rotation of the bit, and the cutting edges 2 are then adapted to be further worn away with the lower ends of recesses 6 insuring reduction in the cross-sectional area of the contacting surfaces of said cutting edges until said edges are worn away to the lines B—B, beyond which point the sharp cutting edges 5 will maintain a reduction in the cross-sectional area of the contacting surfaces of the blades so as to insure cutting engagement by the bit and wearing away of its blades to some point between the lines B—B and C—C before rotation of the bit is arrested by frictional resistance.

I claim:

1. A drill bit blade having a primary cutting edge and divergently tapering in thickness rearwardly from said primary cutting edge, the blade having a longitudinally extending recess in its rear face, said recess merging at its respective ends into the rear face of the blade with the forward end of the recess appreciably spaced rearwardly from the primary cutting edge of the blade, the bottom of the rear portion of said recess sloping toward the front face of the blade forwardly from the rear end of the recess and opening through said front face of the blade so as to form a sharply defined acute angular secondary cutting edge in spaced relation rearwardly from the forward end of the recess, and the bottom of the forward portion of said recess being substantially parallel to and appreciably spaced from the front face of the blade from the forward edge of said opening to the forward end of the recess.

2. A drill bit blade having a primary cutting edge and divergently tapering in thickness rearwardly from said primary cutting edge, the blade having a longitudinally extending recess in its rear face, the bottom of said recess sloping toward the front face of the blade forwardly from the rear end of the recess and opening through said front face of the blade so as to form a sharply defined acute angular secondary cutting edge in spaced relation rearwardly from the primary cutting edge.

3. A drill bit blade having a primary cutting edge and divergently tapering in thickness rearwardly from said primary cutting edge, the blade having a longitudinally extending recess in its rear face, the bottom of the rear portion of said recess sloping toward the front face of the blade forwardly from the rear end of the recess and opening through said front face of the blade so as to form a sharply defined acute angular secondary cutting edge in spaced relation rearwardly from the forward end of the recess.

4. A drill bit blade having a primary cutting edge and divergently tapering in thickness rearwardly from said primary cutting edge, the blade having a longitudinally extending recess in its rear face, the bottom of the rear portion of said recess sloping toward the front face of the blade forwardly from the rear end of the recess and opening through said front face of the blade so as to form a sharply defined acute angular secondary cutting edge in spaced relation rearwardly from the forward end of the recess, and the base of said recess being substantially parallel to and appreciably spaced from the front face of the blade forwardly from the forward edge of said opening.

In testimony whereof he has affixed his signature.

ANTHONY E. McLEAN.